(12) United States Patent
Lindgren et al.

(10) Patent No.: US 10,011,312 B2
(45) Date of Patent: Jul. 3, 2018

(54) PROCESS FOR FORMING REINFORCED ROCKER PANEL ASSEMBLY

(71) Applicant: VAN-ROB Inc., Aurora (CA)

(72) Inventors: Bo Axel Lindgren, Aurora (CA); Cheng Zeng, East Gwillimbury (CA); David John McCabe, Markham (CA); Barry Thomas Kavanaugh, Severn (CA)

( * ) Notice: Subject to any disclaimer, the term of this patent is extended or adjusted under 35 U.S.C. 154(b) by 126 days.

(21) Appl. No.: 15/176,723

(22) Filed: Jun. 8, 2016

(65) Prior Publication Data

US 2017/0355407 A1 Dec. 14, 2017

(51) Int. Cl.
| | | |
|---|---|---|
| *B23K 33/00* | (2006.01) | |
| *B62D 65/00* | (2006.01) | |
| *B62D 65/02* | (2006.01) | |
| B23K 101/00 | (2006.01) | |

(52) U.S. Cl.
CPC .......... *B62D 65/024* (2013.01); *B23K 33/002* (2013.01); *B23K 2201/006* (2013.01)

(58) Field of Classification Search
None
See application file for complete search history.

(56) References Cited

U.S. PATENT DOCUMENTS

| 3,154,129 | A | * | 10/1964 | Hoffman | B21D 5/042 72/313 |
|---|---|---|---|---|---|
| 2005/0161981 | A1 | * | 7/2005 | Chernoff | B60H 1/0055 296/193.07 |
| 2007/0193010 | A1 | * | 8/2007 | Lindgren | B21D 22/02 29/243.58 |
| 2014/0147693 | A1 | * | 5/2014 | Yasuyama | B21D 35/007 428/594 |
| 2014/0193659 | A1 | * | 7/2014 | Lanzerath | B62D 25/20 428/600 |

* cited by examiner

*Primary Examiner* — Devang R Patel (57) ABSTRACT

In a preferred embodiment, there is provided a process for forming a reinforced rocker panel assembly, and which includes positioning a reinforcement patch having first and second patch sections in surface-to-surface contact with a blank panel sheet, and welding the first patch section to the blank panel sheet. The process further includes bending both the blank panel sheet and the reinforcement patch along a bend line interposed between the first and second patch sections to form the blank panel sheet into a rocker panel portion having an elongated base section and a longitudinal flange, where the first and second patch sections are in at least partial abutting contact with the base section and the flange. The process also includes welding the second patch section to the flange.

9 Claims, 9 Drawing Sheets

PROCESS FOR FORMING REINFORCED ROCKER PANEL ASSEMBLY

SCOPE OF THE INVENTION

The present invention relates to a process for forming a reinforced rocker panel assembly, preferably a reinforced inner rocker panel assembly, comprising a rocker panel portion and at least one reinforcement patch welded to the rocker panel portion, and which preferably includes two separate welding steps for welding two different sections of the reinforcement patch to the rocker panel portion before and after cold forming.

BACKGROUND OF THE INVENTION

Passenger vehicles typically include a number of structural components, such as a rocker or rocker panel (hereinafter referred to as "rocker panel"). A rocker panel is a longitudinally extending side structural component normally designed to integrally join to a lower body structure of a vehicle, and to fit below the base of a door opening and between wheel wells. A rocker panel is intended to provide strength and stiffness to a vehicle body, and forms part of integral Body in White ("BIW") structural components with respect to load transfer and vehicle crash safety performance.

A rocker panel may include an inner rocker panel to be placed proximal to a vehicle interior, and an outer rocker panel welded, secured or coupled to the inner rocker panel for placement distal to the vehicle interior. An inner rocker panel may include an elongated metal beam having a generally "U"-shaped cross-sectional profile, and can be produced with a high strength steel sheet, such as that having the grade DP590T to DP980T, cold formed into a desired profile. To reduce vehicle weight while avoiding significant loss of strength and stiffness, it may be desirable to utilize steel materials of higher strength, such as those having an ultimate tensile strength as high as 1300 MPa to 1900 MPa, in the production of an inner rocker panel. With increased tensile strength, however, the steel materials may suffer disadvantages in that material flatness, formability and joint strength may be reduced.

As an alternative or supplemental strategy, it may be desirable to produce an inner rocker panel with a high strength steel of reduced gage thickness, and introduce local reinforcements where greater strength, stiffness and Noise, vibration and harshness ("NVH") performance may be required. Various locally reinforced metal blanks, such as tailor welded blanks, tailor rolled blanks and patch type tailor welded blanks, have been utilized in the past to prepare various locally reinforced vehicle structural components. For example, a tailor welded blank includes a number of metal pieces of different thicknesses or grades which are welded together in an edge-to-edge arrangement. A patch type tailor welded blank is a variant of the tailor welded blank, and includes a reinforcing patch overlapping a portion of a parent blank.

While a tailor welded blank may provide for advantages in significant overall weight reduction, a patch type tailor welded blank or patch type reinforcement may provide for improved overall material integration, and thus improved load transfer and distribution of stresses. Even with patch type reinforcement, however, increasing metal strength grades remains to provide challenges with respect to formability and bendability, especially in forming structural components requiring heavily formed profiles or bend angles.

U.S. Pat. No. 3,209,432 to Cape describes a side rail component where two metal strips are shown as overlapping and generally integrally joined together by for example by spot/pressure welding and/or bonding prior to bending. It has been appreciated that such joining solutions of Cape may not be practical, and become increasingly unworkable for higher bend angles and material strength for configurations, bending processes and applications such as a vehicle rocker panel. For instance, during bending, substantial internal stresses may develop within each material layer, planar and transversal throughout the deformed portion of the bend line. It has been appreciated that each layer has a natural neutral axis as a function of the layers bend radius, and are subject to the strain differential created between inner and outer strips, as a result of the different bend line radii and arc lengths. Severe residual stresses can remain after bending, compromising the structural and dimensional integrity of the structure.

High strength sheet metal rocker panels are known to be produced by cold forming processes, such as stamping, roll forming and bending. Furthermore, patch type reinforcements are known to be used in hot form stamping processes (see for example U.S. Publication No. 2014/0193659 to Lanzerath), where high ductility in a hot state allows for improved formability. The increased ductility of a patch blank allows for increased strain capacity when drawn or bent to shape without significant damage to the material properties. However, significant material thinning can be anticipated, predominantly in the in outer sheet relative to the bend line and good potential for damage within surrounding sheet securement welds/integration. It has been appreciated to be also difficult and expensive to achieve material properties at full potential and distortion control due to non-uniform heating and quenching in the post form heat treating process. The process is relatively complex and high cost.

SUMMARY OF THE INVENTION

It is a non-limiting object of the present invention to provide a process for forming a reinforced metal device, such as a reinforced rocker panel assembly or a reinforced inner rocker panel assembly, which may overcome the shortcomings associated with existing processes, and which may permit for improved reduction of internal stresses, deformations and loss of structural and dimensional integrity of the formed device or assembly.

It is a further non-limiting object of the present invention to provide a process for forming a reinforced rocker panel assembly having a rocker panel portion and at least one reinforcement, patch welded to the rocker panel portion, and which may permit for improved workability, formability and bendability of the reinforcement patch in combination with a blank metal sheet for forming the reinforced rocker panel assembly.

It is a further non-limiting object of the present invention to provide a process for forming a reinforced rocker panel assembly, and which may incorporate a two-step, pre-bending and post-bending welding approach to secure the reinforcement patch to the rocker panel portion, and which may provide for reduction of internal stresses and deformations between the rocker panel portion and the reinforcement patch.

It is a further non-limiting object of the present invention to provide a process for forming a reinforced rocker panel assembly, and which may permit for use with metal blanks of reduced gage thicknesses, while allowing for improved physical contact between the reinforcement patch and the rocker panel portion after bending.

In one simplified aspect, the present invention provides a process for forming a reinforced rocker panel assembly comprising a rocker panel portion and a reinforcement patch, the process comprising: positioning the reinforcement patch in at least partial surface-to-surface contact with a blank panel sheet; welding the reinforcement patch to the blank panel sheet on a first side of a predetermined bend line extending along a plane of the reinforcement patch overlapping the blank panel sheet; bending the reinforcement patch and the blank panel sheet along the bend line; and welding the reinforcement patch to the blank panel sheet on a second side of the bend line. Said bending preferably comprises clamping the reinforcement patch and the blank panel sheet on the first side, and applying a bending force to the reinforcement patch and the blank panel sheet on the second side. The rocker panel portion and the reinforcement patch welded thereto preferably have respective inwardly oriented contact surfaces in substantially abutting contact with each other.

In another aspect, the present invention provides a process for forming a reinforced rocker panel assembly comprising a rocker panel portion and at least one reinforcement patch welded to the rocker panel portion, the rocker panel portion comprising an elongated base section and a longitudinal flange integrally coupled to the base section, and the reinforcement patch comprising a first patch section and a second patch section integrally coupled to the first patch section, wherein the process comprises: i) positioning the reinforcement patch in at least partial surface-to-surface contact with a blank panel sheet with the second patch section disposed proximal to a lateral edge of the blank panel sheet, and the first patch section disposed distal to the lateral edge, and welding the first patch section to the blank panel sheet; ii) bending both the blank panel sheet and the reinforcement patch along a bend line interposed between the first and second patch sections along a plane of the reinforcement patch to form the blank panel sheet into the rocker panel portion, whereby the first and second patch sections respectively are in at least partial abutting contact with the base section and the flange; and iii) welding the second patch section to the flange to thereby form the reinforced rocker panel assembly.

In yet another aspect, the present invention provides a process for forming a reinforced rocker panel assembly comprising a rocker panel portion and at least one reinforcement patch welded to the rocker panel portion, the rocker panel portion comprising an elongated base section and a longitudinal flange integrally coupled to the base section, and the reinforcement patch comprising a first patch section and a second patch section coupled to the first patch section, wherein the process comprises: i) positioning the reinforcement patch in at least partial surface-to-surface contact with a blank panel sheet with the second patch section disposed proximal to a lateral edge of the blank panel sheet, and the first patch section disposed distal to the lateral edge, and welding the first patch section to the blank panel sheet; ii) clamping the first patch section and a first sheet section of the blank panel sheet positioned adjacent to the first patch section, the first patch section being welded to the first sheet section, and applying a bending force to the second patch section and a second sheet section of the blank panel sheet positioned adjacent to the second patch section, thereby forming the first and second sheet sections respectively into the base section and the flange along a bend line interposed between the first and second patch sections along a plane of the reinforcement patch, whereby the first and second patch sections respectively are in at least partial abutting contact with the base section and the flange; and iii) welding the second patch section to the flange to thereby form the reinforced rocker panel assembly.

In yet another aspect, the present invention provides a process for forming a reinforced metal device, the process comprising: i) positioning a generally planar metal reinforcement patch having first and second patch sections in at least partial surface-to-surface contact with a base metal sheet, and welding the first patch section to the base metal sheet; ii) clamping the first patch section and a first sheet section of the base metal sheet positioned adjacent to the first patch section, the first patch section being welded to the first sheet section, and applying a bending force to the second patch section and a second sheet section of the base metal sheet positioned adjacent to the second patch section, thereby bending the second patch section and the second sheet section at a bending angle between about 20° and about 160° relative to the first patch section and the first sheet section along a bend line interposed between the first and second patch sections along a plane of the reinforcement patch, whereby the first and second patch sections respectively are in at least partial abutting contact with the first and second sheet sections; and iii) welding the second patch section to the second sheet section to thereby form the reinforced metal device.

In one embodiment, said bending comprises clamping the first patch section and a first sheet section of the blank panel sheet positioned adjacent to the first patch section, the first patch section being welded to the first sheet section, and applying a bending force to the second patch section and a second sheet section of the blank panel sheet positioned adjacent to the second patch section, thereby forming the second sheet section into the flange in the at least partial abutting contact with the second patch section. In an alternative embodiment, said bending comprises clamping the second patch section and the second sheet section, and applying the bending force to the first patch section and the first sheet section.

In one embodiment, the bending angle between the first patch/sheet sections and the second patch/sheet sections after said bending or applying the bending force is between about 20° and about 160°, preferably between about 40° and about 140°, more preferably between about 60° and about 120°, or most preferably about 90°.

In one embodiment, said clamping comprises holding down the first patch section and the first sheet section on a stationary lower clamping die with a movable upper clamping die in a clamping arrangement, one or both said upper and lower clamping dies comprising a laterally disposed bend forming lip, wherein in the clamping arrangement, the bend forming lip is substantial aligned with the bend line, and said applying the bending force comprises moving a generally horizontal bending bar member upwardly or downwardly in a generally circular path along a pivoting axis substantially parallel to the bend line to urge the bending bar member against one of the second patch section and the second sheet section, thereby urging other one of the second patch section and the second sheet section against the bend forming lip.

In one embodiment, said clamping comprises clamping the first patch section and the first sheet section between opposed first and second clamping dies in a clamping arrangement, each said clamping dies comprising respective clamping contact surfaces, and one or both said clamping dies comprising a bend forming lip extending substantially normal to the clamping contact surface, wherein in the clamping arrangement, the bend forming lip is substantial aligned with the bend line, and said applying the bending force comprises moving a bending bar member in a generally circular path along a pivoting axis substantially parallel to the bend line and a longitudinal axis of the bending bar member to urge the bending bar member against one of the second patch section and the second sheet section, thereby urging other one of the second patch section and the second sheet section against the bend forming lip.

In one embodiment, both the first patch section and the first sheet section are generally planar, and in the clamping arrangement, the first patch section and the first sheet section are in substantial surface-to-surface contact with each other. In one embodiment, both the reinforcement patch and the base or blank panel sheet are generally planar, and said positioning comprises positioning the reinforcement patch in substantial surface-to-surface contact with each other. It is to be appreciated however that the reinforcement patch and the base or blank panel sheet may include one or more of strengthening or stiffening ribs coupled thereto or formed thereon, or any other components for modifying various characteristics or properties of the rocker panel assembly or metal device. In one embodiment, the elongated base section or the first sheet section comprises an elongated rib formed along a length of the elongated base section or the first sheet section, and said process optionally further comprises machine stamping the elongated rib on the blank panel sheet or base metal sheet. In one embodiment, the inner rocker panel portion further comprises a pair of elongated strip portions each integrally coupled to a respective longitudinal edge of an associated one of the flanges, said strip portions extending transversely outwardly relative to the base section.

In one embodiment, the upper clamping die comprises the bend forming lip, the bending bar member comprises an oblong cross section having a cross-sectional length, and in the clamping arrangement, the first sheet section is adjacent to the lower clamping die, and the first patch section is adjacent to the upper clamping die, and wherein said moving the bending bar member comprises moving the bending bar member upwardly in the generally circular path to urge the bending bar member against the second sheet section with the cross-sectional length oriented substantially normal to a plane of the section sheet section, thereby urging the second patch section against the bend forming lip, wherein the generally circular path has a radius greater than or equal to a thickness of the bend forming lip adjacent to the bend line.

In one embodiment, the first clamping die comprises the bend forming lip, the bending bar member comprises an oblong cross section having a cross-sectional length, and in the clamping arrangement, the first sheet section is adjacent to the second clamping die, and the first patch section is adjacent to the first clamping die, and wherein said moving the bending bar member comprises moving the bending bar member in the generally circular path towards the first clamping die to urge the bending bar member against the second sheet section with the cross-sectional length oriented substantially normal to a plane of the second sheet section, thereby urging the second patch section against the bend forming lip, wherein the generally circular path has a radius greater than or equal to a thickness of the bend forming lip adjacent to the bend line.

In one embodiment, the circular path is a spiral path of increasing or decreasing radius towards the bend forming lip.

It is to be appreciated that said welding of the first/second patch sections are not particularly limited, provided that said welding provides for securement of the patch sections to associated parts of the base or panel sheet, or the rocker panel portion. Said welding may include but not limited to electric resistance welding, shielded metal arc welding, gas metal arc welding, submerged arc welding, flux-cored arc welding, electroslag welding, laser beam welding, electron beam welding, electromagnetic pulse welding, friction stir welding, cold metal transfer welding and any other welding technique known in the art. In one embodiment, the first and second patch sections respectively comprise opposed first and second edge portions, each said edge portions being generally parallel to the bend line, and wherein said welding the first patch section comprises laser lap, edge or lap stitch welding the first edge portion to the blank panel sheet, and said welding the second patch section comprises laser lap, edge or lap stitch welding the second edge portion to the flange, and wherein prior to said bending, the process optionally further comprises further securing the first patch section to the blank panel sheet using one or more of crimping, clinching and bonding with an adhesive. Alternatively, said welding of the first/second patch sections may include welding other parts of the first/second patch sections, depending on the specific requirements or applications of the reinforced rocker panel assembly or metal device.

In one embodiment, the first and second patch sections respectively comprise opposed first and second edge portions, each said edge portions being generally parallel to the bend line, and wherein said welding the first patch section comprises laser lap, edge or lap stitch welding the first edge portion to the base metal sheet, and said welding the second patch section comprises laser lap, edge or lap stitch welding the second edge portion to the second sheet section, and wherein prior to said bending, the process optionally further comprises further securing the first patch section to the base metal sheet using one or more of crimping, clinching and bonding with an adhesive.

In one embodiment, the reinforced rocker panel assembly is a reinforced inner rocker panel assembly, and the rocker panel portion is an inner rocker panel portion comprising the elongated base section and a pair of said longitudinal flanges integrally coupled to associated longitudinal edges of the base section, said longitudinal flanges being oriented in generally opposed orientation to each other. In one embodiment, the inner rocker panel portion has a generally "U"-shaped cross sectional profile. It is to be appreciated that to form the rocker panel assembly having the rocker panel portion provided with a pair of said longitudinal flanges, the process of the current invention may be repeated twice to form the two flanges, whereby the two flanges are welded to two separate reinforcement patches or a single reinforcement patch, or one of the two flanges is welded to a reinforcement patch. In an embodiment in which one of the two flanges is welded to a reinforcement patch, the other flange not welded to a reinforcement patch may of course be simply formed in the absence of any positioning and welding steps using known metal bending techniques or using the same clamping dies and bending bar member, before or after conducting the process of the present invention for forming the other flange welded to the reinforcement patch.

In an embodiment in which the two flanges are welded to two separate reinforcement patches, the two reinforcement patches are preferably sized to reduce or avoid an overlap between the respective first patch sections over the base section. In an embodiment in which the flanges are welded to a single reinforcement patch, the reinforcement patch is preferably sized to extend transversely over the base section and outwardly over respective second sheet sections to be subsequently formed to the two flanges. It is to be appreciated that the reinforcement patch is not strictly limited to being sized to completely extend over a length of the base section and the flange. By way of a non-limiting examples, the process may be modified to form the rocker panel portion welded to two or more reinforcement patches, a first one of the reinforcement patches being welded to a first one of the two flanges proximal to one axial end of the rocker panel portion, and a second one of the reinforcement patches being welded to both said flanges on the other axial end, where the first and second reinforcement patches are sized to avoid an overlap over the base section. In such embodiment, the first flange may be formed by clamping the respective first patch sections of the first and second reinforcement patches over the first sheet section (or the base section), applying the bending force to the second sheet section to be formed into the first flange, and the respective second patch sections of the first and second reinforcement patches, and welding the second patch sections to the first flange.

In one embodiment, the reinforcement patch and the rocker panel portion are independently obtained from one or more materials selected from the group consisting of steel, aluminum, iron and magnesium, and the reinforcement patch and the rocker panel portion independently have a tensile strength between about 780 MPa and about 2200 MPa, and a thickness between about 0.5 mm and about 3.0 mm. In one embodiment, the reinforcement patch and the rocker panel portion are obtained from steel having a tensile strength between about 1000 MPa and 1500 MPa. It is to be appreciated that other dimensions, such as the lengths and the widths, of the blank panel sheet, the base metal sheet and the reinforcement patch may be selected depending on the specific required dimensions and specifications of the reinforced metal device or rocker panel assembly.

BRIEF DESCRIPTION OF THE DRAWINGS

Reference may now be had to the following detailed description taken together with the accompanying drawings in which.

DETAILED DESCRIPTION OF THE PREFERRED EMBODIMENTS

Figure 1:
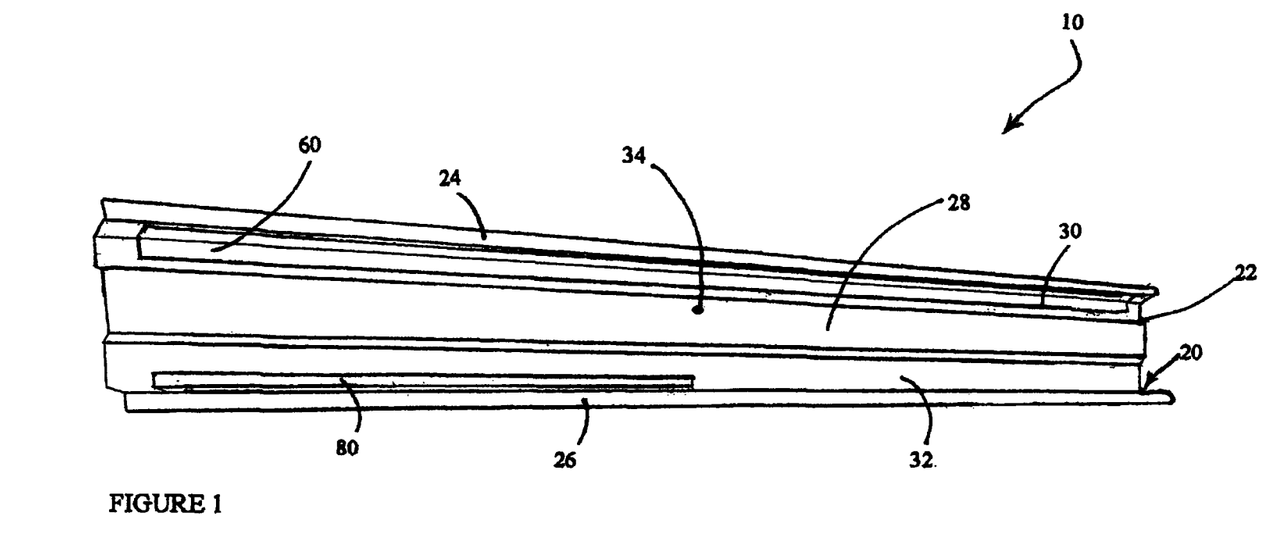
FIG. 1 is a perspective view of a reinforced inner rocker panel as prepared with a process in accordance with a preferred embodiment of the present invention, and which includes an elongated rocker panel beam and first and second corner reinforcement patches welded thereto.

Reference is made to FIG. 1 which shows a perspective view of a reinforced inner rocker panel 10 as prepared by a process in accordance with a preferred embodiment of the present invention. As will be further described below, the inner rocker panel 10 includes an elongated rocker panel beam 20, and first and second corner reinforcement patches 60, 80 shown in FIG. 1 as being welded to the rocker panel beam 20.

The rocker panel beam 20 has a generally "U"-shaped cross sectional profile, so as to include a generally rectangular base beam portion 22, and a pair of opposed lateral flanges 24, 26 integrally coupled to associated longitudinal edges of the base beam portion 22 to cooperatively define an inward channel therebetween. For additional rigidity and strength, a strengthening rib 28 is integrally formed along a length of the base beam portion 22 to extend towards the inward channel, thereby forming a pair of laterally extending webs 30, 32 interposed between the strengthening rib 28 and an associated one of the lateral flanges 24, 26. Each of the lateral flanges 24, 26 have a respective first flange portion integrally coupled to an associated one of the webs 30, 32 in a substantial normal orientation thereto, and a respective second flange portion integrally coupled to the first flange portion in a substantially normal orientation thereto, where the second flange portion is generally coplanar with the associated one of the webs 30, 32. The strengthening rib 28 defines a plurality of apertures 34 sized for potentially receiving fastening bolts or screws in the attachment of the inner rocker panel 10 to a vehicle or a structural component thereof.

The first and second reinforcement patches 60, 80 have respective first and second elongated patch portions oriented substantially normal to each other to provide the reinforcement patches 60, 80 with a generally "L"-shaped cross sectional profile. The first and second elongated patch portions of the first corner reinforcement patch 60 are in substantially abutting contact with the web 30 and the lateral flange 24, respectively, and those of the second corner reinforcement patch 80 with the web 32 and the lateral flange 26, respectively. Ultimately, the inner rocker panel 10 was prepared by cold forming the rocker panel beam 20, together with the reinforcement patches 60, 80, as will be further described below.

Figure 2:
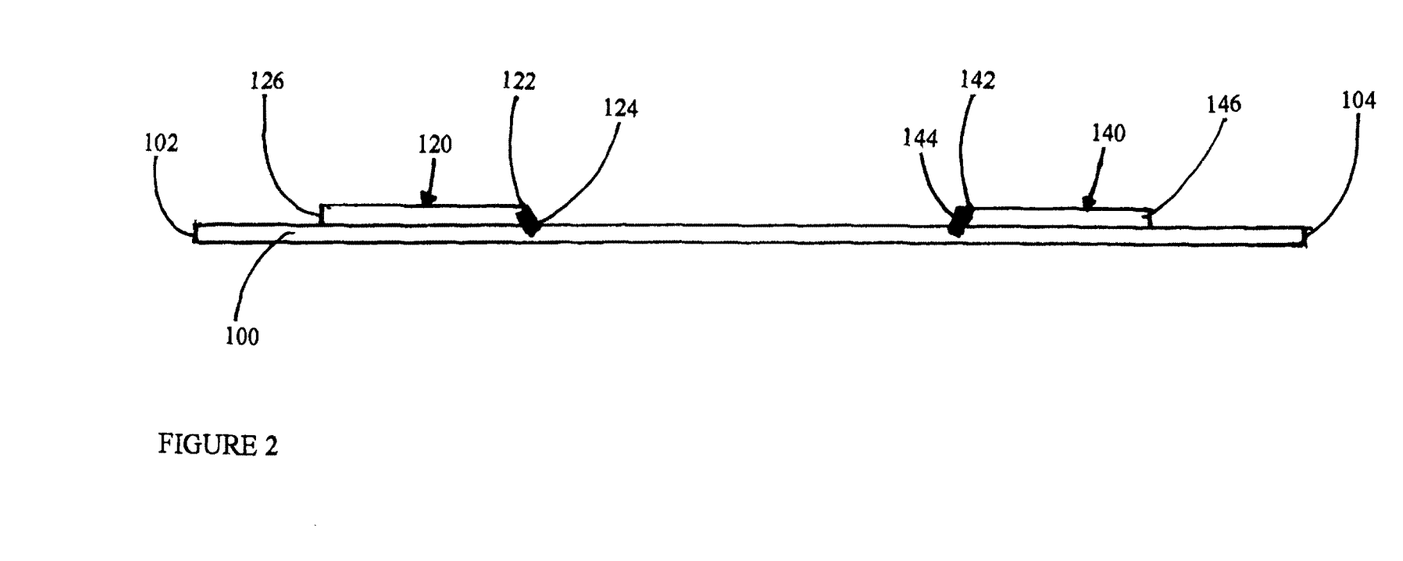
FIG. 2 is an axial elevation view of first and second steel patch sheets positioned and welded over a blank steel sheet, and which illustrates a first step of the process in accordance with a preferred embodiment of the present invention.
Figure 3:
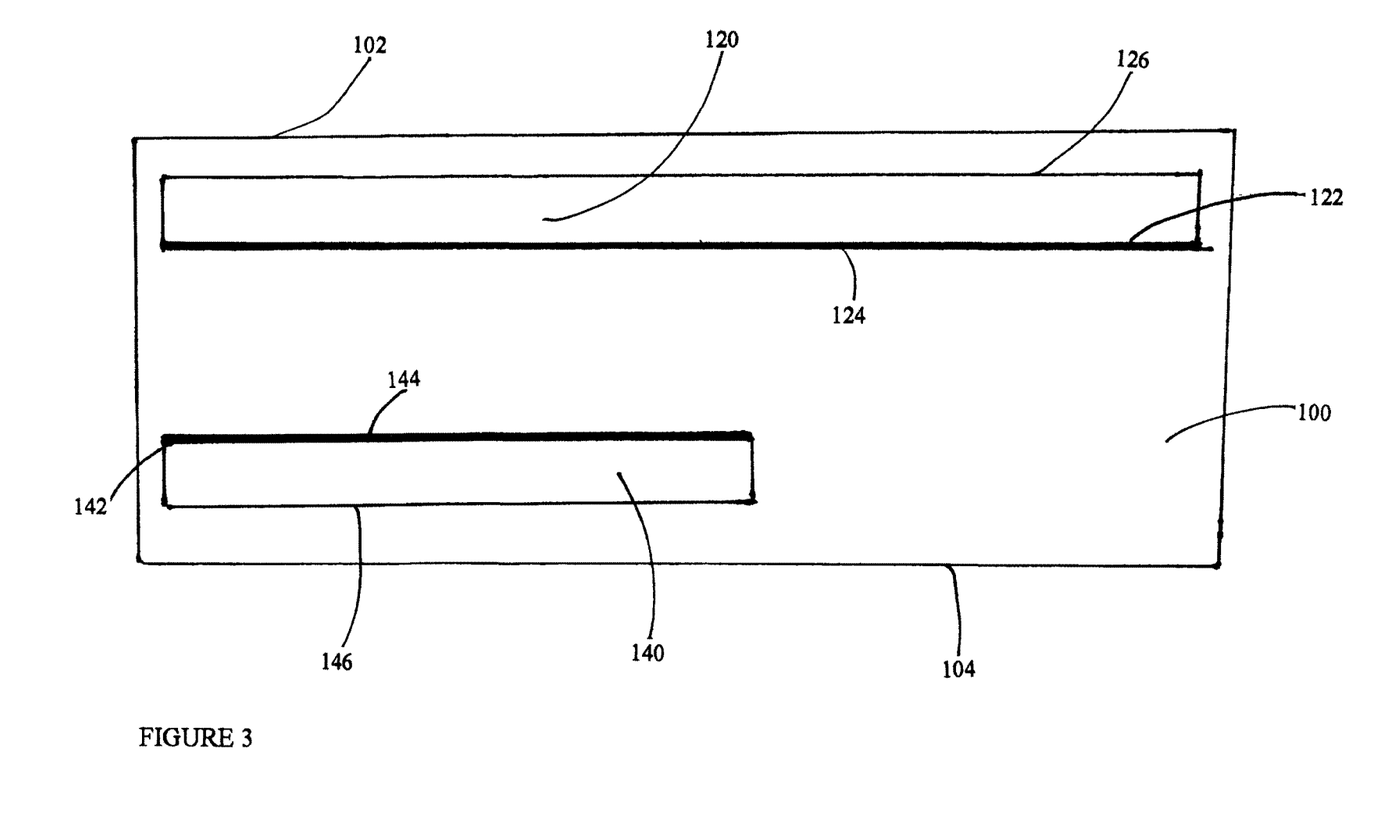
FIG. 3 is a top view of the steel patch sheets and the blank steel sheet as shown in FIG. 2.

Reference is made to FIG. 2 which shows an axial elevation view of a generally rectangular steel blank sheet 100 in surface-to-surface contact with first and second steel patch sheets 120, 140, illustrating a first step of the process in accordance with a preferred embodiment of the present invention. As will be further discussed below, the steel blank sheet 100 is to be cold formed to the rocker panel beam 20, and the steel patch sheets 120, 140 to the reinforcement patches 60, 80. In the first step, respective surfaces of the steel patch sheets 120, 140 were positioned over a surface of the blank sheet 100, such that the first patch sheet 120 was positioned proximal to a first longitudinal edge 102 of the blank sheet 100, and the second patch sheet 140 to a second longitudinal edge 104 of the sheet 100. As more clearly seen in FIG. 3, the patch sheets 120, 140 were oriented such that the longitudinal edges 102, 104 are substantially parallel to respective lengths of the patch sheets 120, 140. Once properly positioned, respective inner longitudinal edge portions 122, 142 of the first and second patch sheets 120, 140 were laser edge welded to the blank sheet 100 to form welding joints 124, 144, respectively, and respective outer longitudinal edge portions 126, 146 of the first and second patch sheets 120, 140 were not secured to the blank sheet 100.

Figure 4:
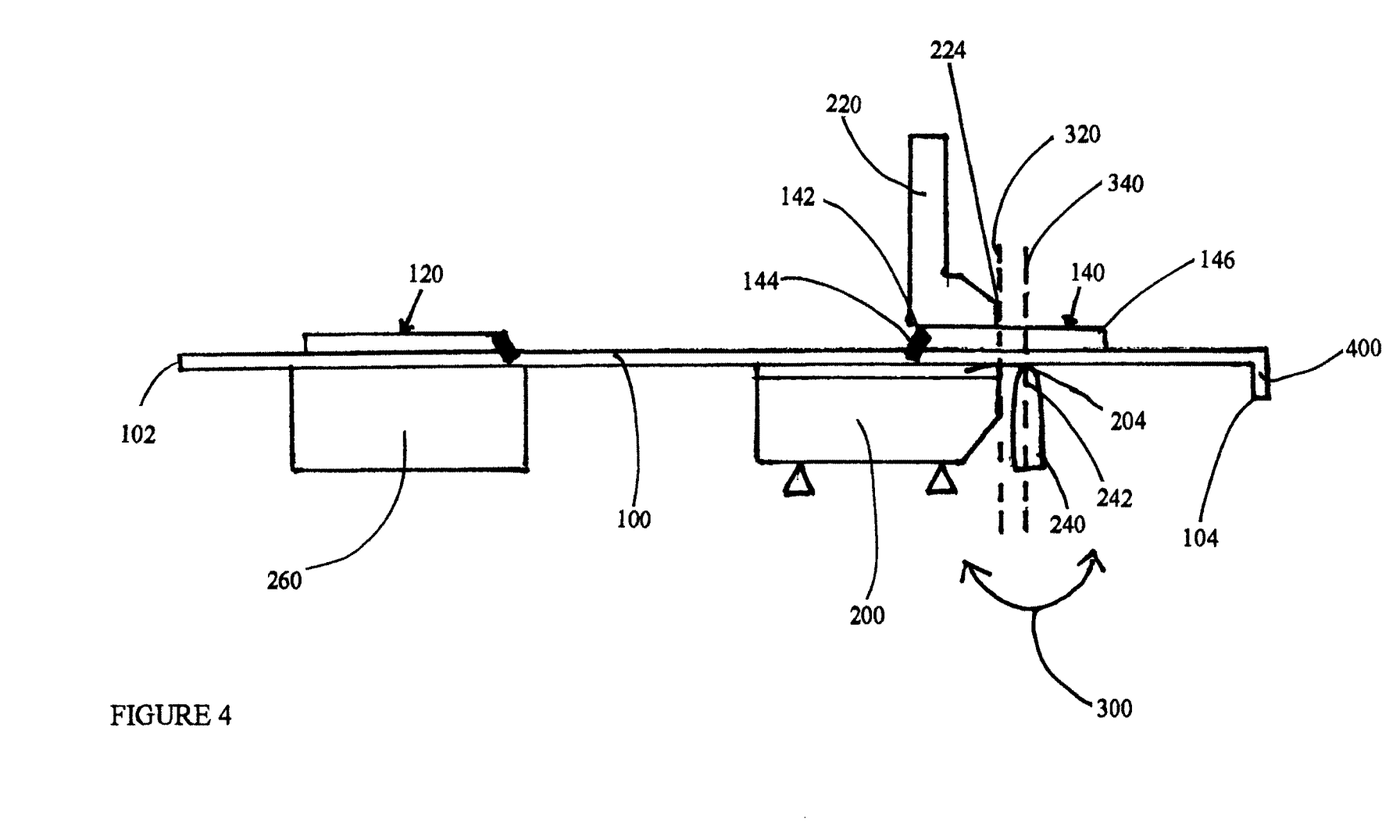
FIG. 4 is an axial elevation view of the steel patch sheets and the blank steel sheet shown in FIG. 2, and which illustrates a second step of the process in accordance with a preferred embodiment of the present invention before bending.
Figure 5:
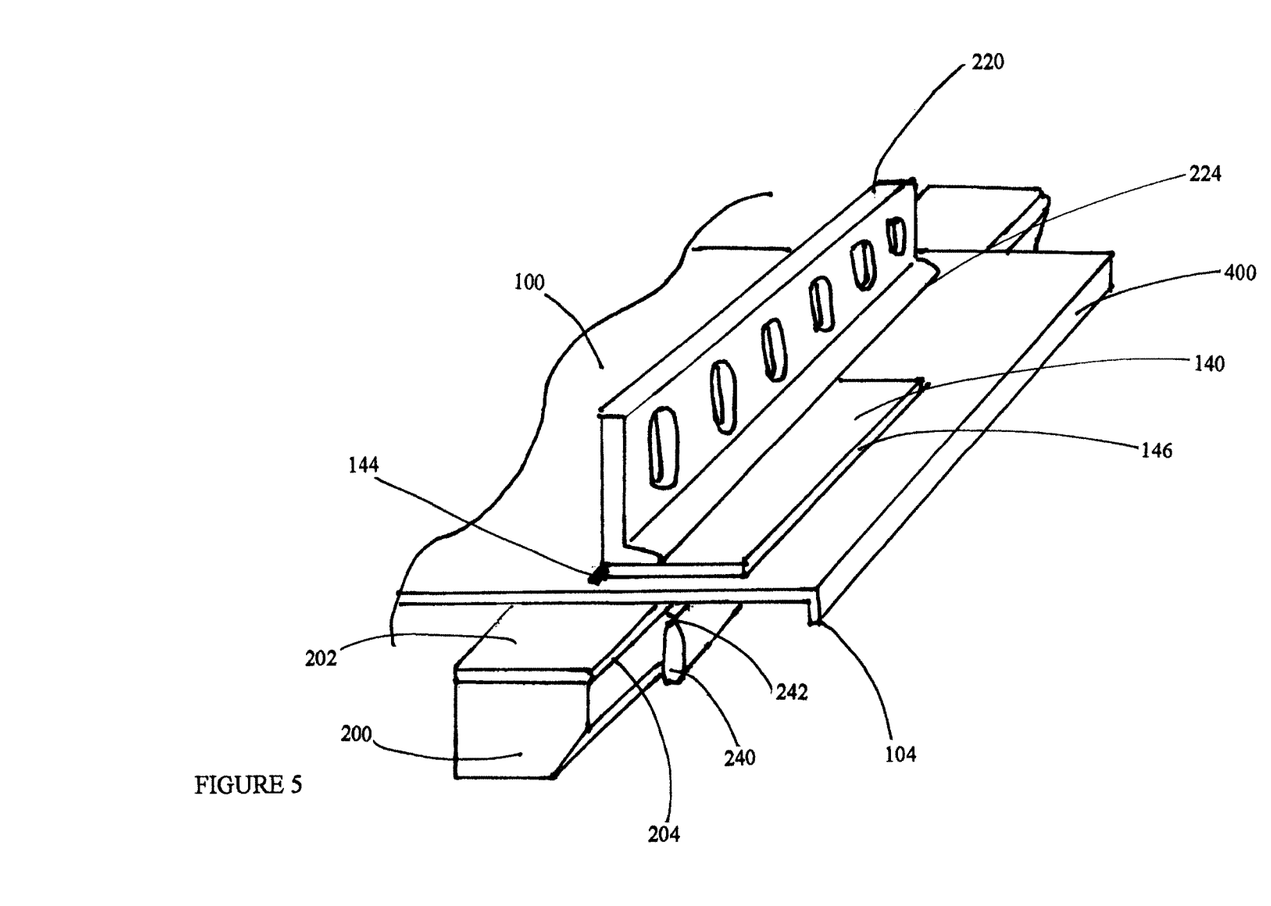
FIG. 5 is a partial perspective view of the steel patch sheets and the blank steel sheet shown in FIG. 2, and which illustrates a second step of the process in accordance with a preferred embodiment of the present invention before bending.

Reference is made to FIGS. 4 and 5 which show axial elevation and partial perspective views of the sheets 100, 120, 140 positioned in a metal bending device, illustrating a second step of the process in accordance with a preferred embodiment of the present invention. The metal bending device has a stationary base clamping die 200, a movable upper clamping die 220 for applying a clamping force against the base clamping die 200, a pivotable bend forming die 240 for applying a bending force against a surface of the blank sheet 100, and a support platform 260 laterally distanced from the base clamping die 200. Both the base clamping die 200 and the upper clamping die 220 include respective clamping surfaces 202 (that of the upper clamping die 220 not shown), as well as respective inner bend forming portions 204, 224 longitudinally extending along a length of the dies 200, 222. The bend forming die 240 is generally formed as a horizontally extending beam having a cross sectional profile in the shape of a rectangle with a rounded end to form a longitudinally extending contact portion 242. For simplicity, FIGS. 4 and 5 do not show other portions of the metal bending device, including an actuator selectively operable to move or rotate the bend forming die 240 either upwardly or downwardly in a circular path 300, as will be further discussed below.

To simultaneously cold form the blank sheet 100 proximal to the second edge 104 and the second patch sheet 140 into the lateral flange 26 and the second corner reinforcement patch 80, respectively, the blank sheet 100 with the welded second patch sheet 140 was placed over the clamping surface 202 of the base clamping die 200, such that the clamping surface 202 contacts a lower surface of the blank sheet 100. When placed on the clamping surface, the inner bend forming portion 204 was substantially aligned with a predetermined bending line 320 as seen in FIG. 4, where the bending line 320 is interposed between the inner and outer longitudinal edge portions 142, 146 of the second patch sheet 140 in substantially parallel orientation therewith. The clamping surface of the upper clamping die 220 was then urged against an upper surface of the steel patch sheet 140 towards the base clamping die 200 to thereby clamp the blank sheet 100 and the steel patch sheet 140 between the clamping dies 200, 220, where the inner bend forming portion 224 is substantially aligned with the bending line 320.

Figure 6:
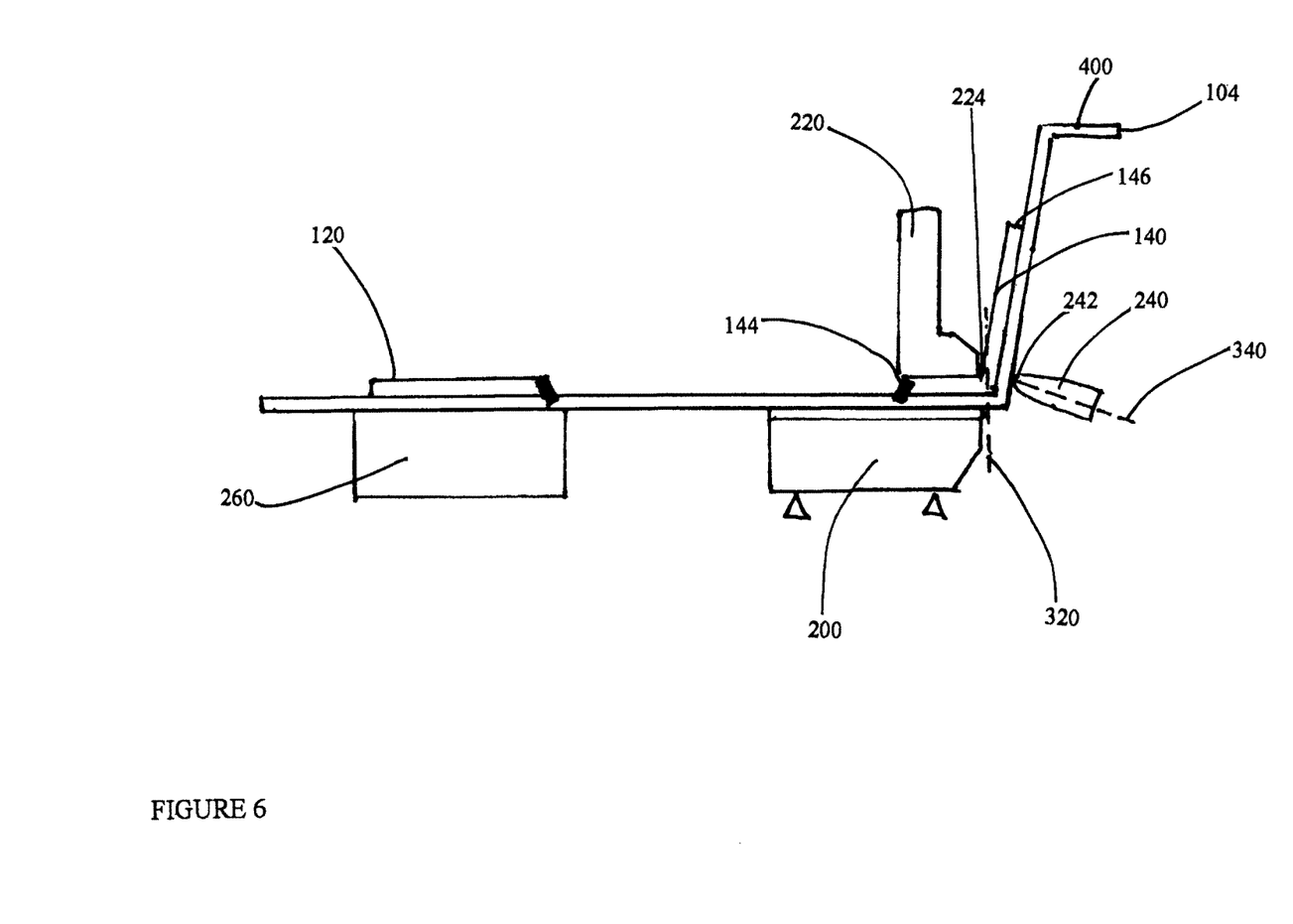
FIG. 6 is an axial elevation view of the steel patch sheets and the blank steel sheet shown in FIG. 2, and which illustrates a second step of the process in accordance with a preferred embodiment of the present invention after bending.

As seen in FIG. 4, after clamping, the longitudinally extending contact portion 242 of the bend forming die 240 was brought into physical contact with the lower surface of the blank sheet 100 between the bending line 320 and the second longitudinal edge 104 in substantially parallel orientation therewith. When contacting the blank sheet 100, a longitudinal axis 340 of the rectangular cross sectional profile of the bend forming die 240 was oriented substantially normal to the lower surface of the blank sheet 100. Once in contact, as seen in FIG. 6 the bend forming die 240 was pivoted upwardly in the circular path 300, while maintaining the normal orientation between the longitudinal axis 340 and the lower surface of the blank steel sheet 100, to bend both the blank sheet 100 and the second patch sheet 140 upwardly to a predetermined angle of about 85°. During the bending, a portion of the second patch sheet 140 along the bending line 320 was urged against the inner bend forming portion 224, so as to reduce physical separation between the blank sheet 100 and the second patch sheet 140 along the bending line 320. Although not expressly shown in FIGS. 4 to 6, the circular path 300 as may be traced by the contact portion 242 of the bend forming die 240 during the pivoting movement had a radius substantially equal to or greater than a thickness of the inner bend forming portion 224 adjacent to the bending line 320 to further facilitate the reduction of physical separation between the blank sheet 100 and the second patch sheet 140.

It is to be noted that an outermost flanged portion 400 of the blank sheet 100 proximal to the second longitudinal edge 104 as shown in FIGS. 4 to 6 was formed prior to the bending of the sheets 100, 140 along the bending line 320 as described directly above. In particular, the flange portion 400 was formed using the same clamping dies 200, 220 and the bend forming die 240, and using a bending operation similar to that described above, except the bend forming die 240 was actuated downwardly, and not upwardly. Of course, a bend line for forming the flanged portion 400 is between the bending line 320 and the second longitudinal edge 104.

Figure 7:
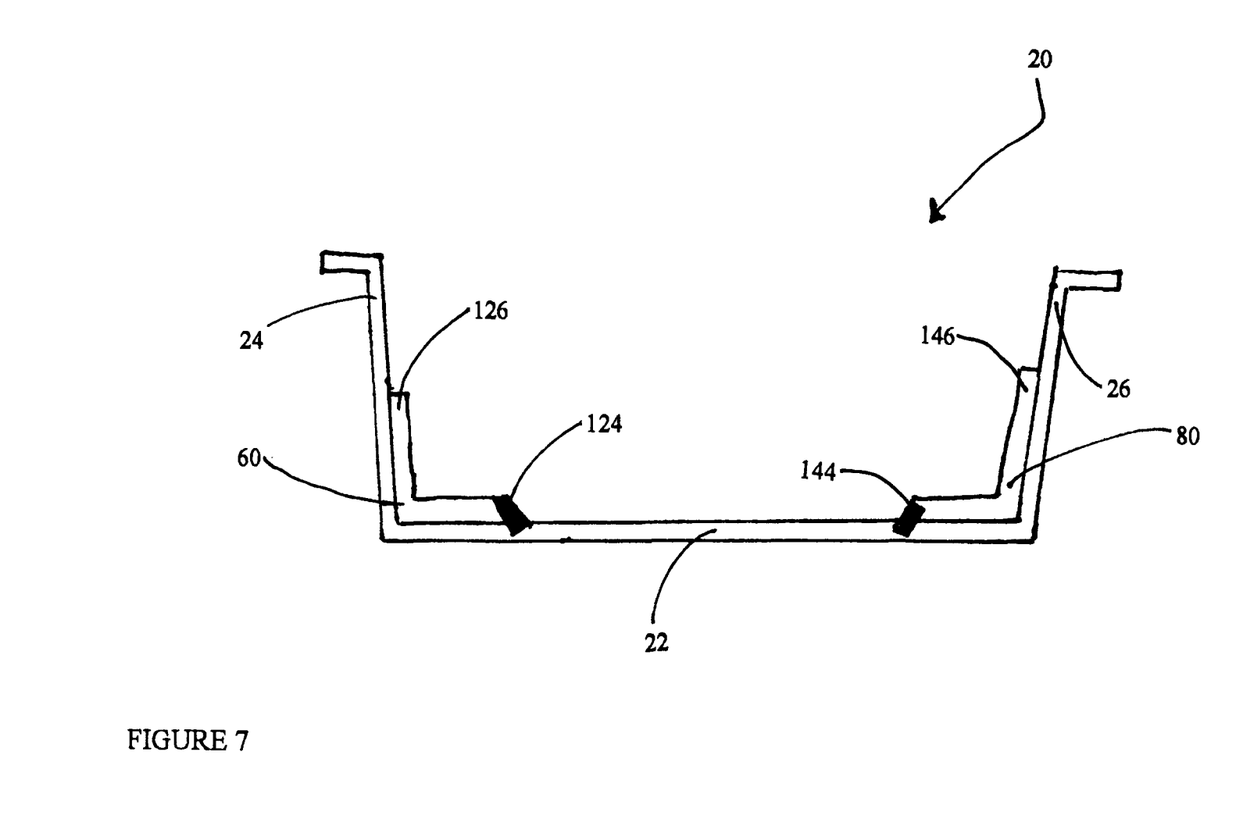
FIG. 7 is an axial elevation view of the elongated rocker panel beam and the first and second corner reinforcement patches welded thereto as shown in FIG. 1, and prior to second welding step and final stamping step.
Figure 8:
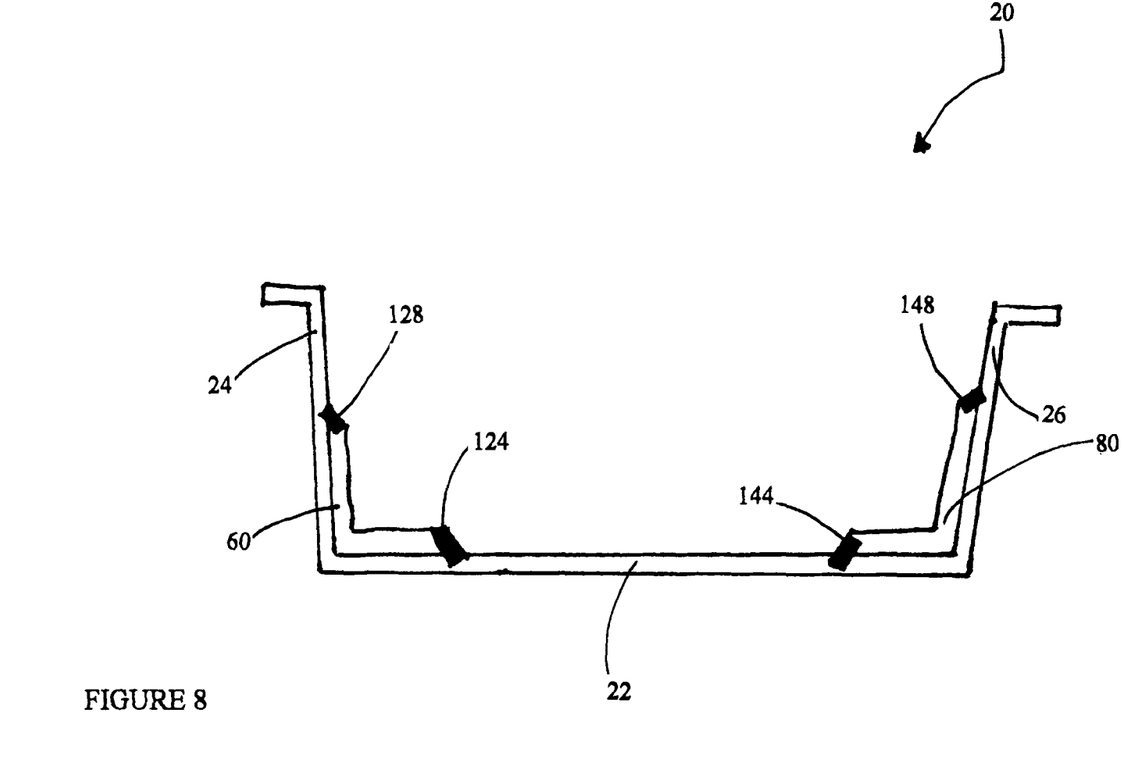
FIG. 8 is an axial elevation view of the elongated rocker panel beam and the first and second corner reinforcement patches welded thereto as shown in FIG. 1, and final stamping step.

The same bending operations were repeated with the blank sheet 100 proximal to the first longitudinal edge 102 and the first patch sheet 120 to form the blank sheet 100 to the rocker panel beam 20 with the base beam portion 22 and the lateral flanges 24, 26, and the first and second patch sheets 120, 140 to the first and second reinforcement patches 60, 80 welded to the base beam portion 22 only, as seen in FIG. 7. The reinforcement patches 60, 80 were further laser edge welded to the lateral flanges 24, 26, respectively (along the outer longitudinal edge portions 126, 146 of the corresponding first and second patch sheets 120, 140), to form welding joints 128, 148, as seen in FIG. 8.

After forming the welding joints 128, 148, various stamping and/or punching operations were performed to form the strengthening rib 28 and the apertures 34.

The applicant has appreciated that the process of the current invention may permit for forming of the rocker panel beam 20 with reduced internal stresses, deformations and loss of structural and dimensional integrity between the sheets 100, 120, 140. In particular, by initially welding the patch sheet 140 along the inner longitudinal edge portion 142 only to the blank sheet 100 leaves the outer longitudinal edge portion 146 as a free end not secured to the blank sheet 100. It has been envisioned by the applicant that by clamping the sheets 100, 140 in the welded end only, and bending near the free end may permit for relative sliding movement between the sheets 100, 140 during the bending operation (as resulting from different bending radii of the sheets 100, 140), so as to reduce or eliminate internal stresses which may otherwise develop from bending a blank sheet provided with a fully integrated or welded patch.

Figure 9:
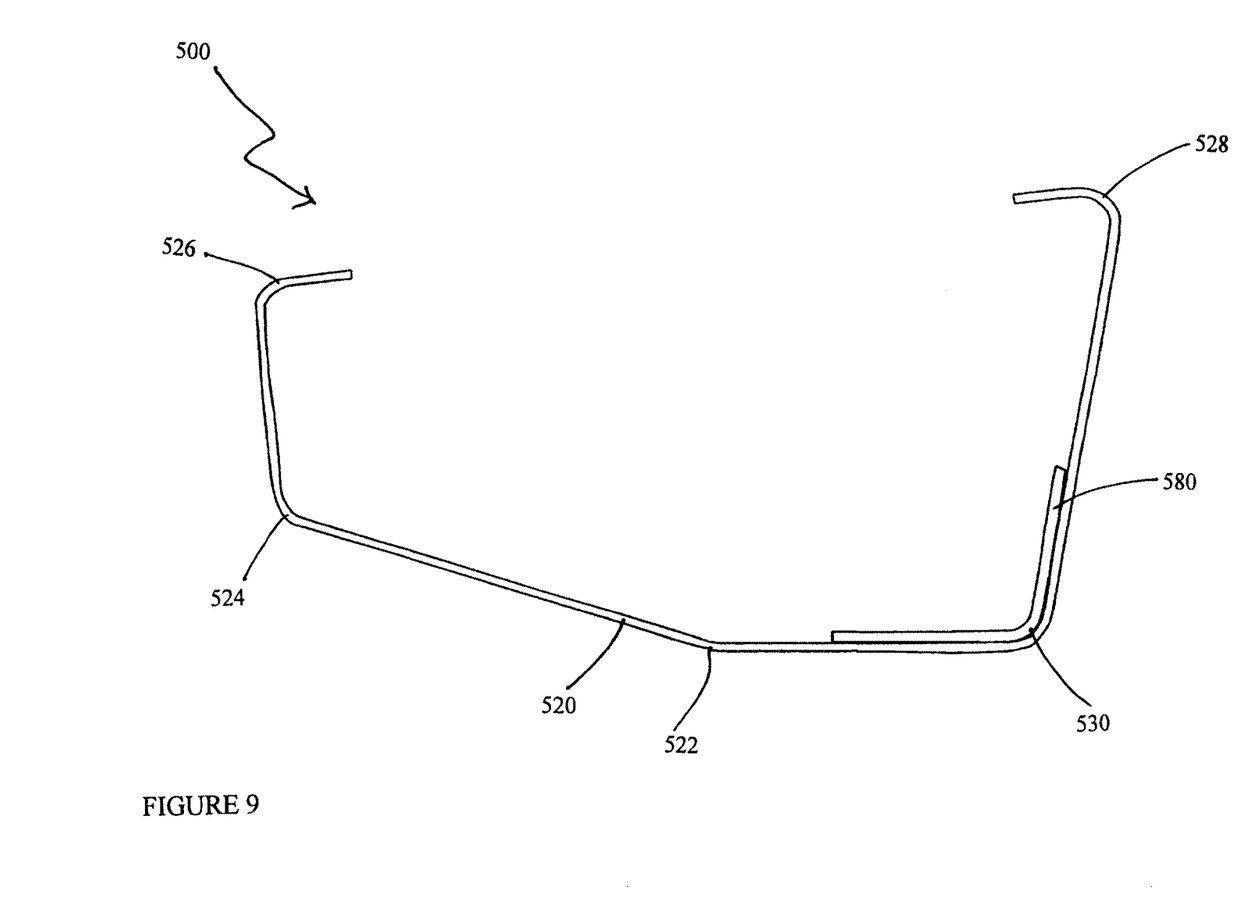
FIG. 9 is an axial elevation view of a reinforced metal device as prepared with a process in accordance with an alternative embodiment of the present invention, and which includes a base metal sheet and a single metal reinforcement patch welded thereto.

It is to be appreciated while the process has been described for preparing the reinforced inner rocker panel 10, the process of the present invention may permit configuration to permit preparation of other reinforced metal devices of differing purposes, designs, dimensions and orientations. As shown in FIG. 9, a reinforced metal device 500 may be prepared with a base metal sheet 520 welded to a single metal reinforcement patch 580 using the process as described above in respect of the rocker panel beam 20, and the second corner reinforcement patch 80. Depending on the manufacturer's capacities and equipment, base metal sheet bends 522, 524, 526, 528 of differing bend angles and locations not overlapping with the reinforcement patch 580 may be formed on the base metal sheet 520 before or after simultaneously forming and welding the sheet 520 and the patch 580 at a bending line 530. The reinforcement metal device 500 may be formed into different shapes or profiles, depending on the intended purpose and use of the device 500.

While the invention has been described with reference to preferred embodiments, the invention is not or intended by the applicant to be so limited. A person skilled in the art would readily recognize and incorporate various modifications, additional elements and/or different combinations of the described components consistent with the scope of the invention as described herein.

We claim:

1. A process for forming a reinforced rocker panel assembly comprising a rocker panel portion and at least one reinforcement patch welded to the rocker panel portion, the rocker panel portion comprising an elongated base section and a longitudinal flange integrally coupled to the base section, and the reinforcement patch comprising a first patch section and a second patch section integrally coupled to the first patch section, wherein the process comprises: i) positioning the reinforcement patch in at least partial surface-to-surface contact with a blank panel sheet with the second patch section disposed proximal to a lateral edge of the blank panel sheet, and the first patch section disposed distal to the lateral edge, and welding the first patch section to the blank panel sheet; ii) bending both the blank panel sheet and the reinforcement patch along a bend line interposed between the first and second patch sections along a plane of the reinforcement patch to form the blank panel sheet into the rocker panel portion, whereby the first and second patch sections respectively are in at least partial abutting contact with the base section and the flange; and iii) welding the second patch section to the flange to thereby form the reinforced rocker panel assembly, wherein said bending comprises clamping the first patch section and a first sheet section of the blank panel sheet positioned adjacent to the first patch section, the first patch section being welded to the first sheet section, and applying a bending force to the second patch section and a second sheet section of the blank panel sheet positioned adjacent to the second patch section, thereby forming the second sheet section into the flange in the at least partial abutting contact with the second patch section, wherein said clamping comprises holding down the first patch section and the first sheet section on a stationary lower clamping die with a movable upper clamping die in a clamping arrangement, one or both said upper and lower clamping dies comprising a laterally disposed bend forming lip, wherein in the clamping arrangement, the bend forming lip is aligned with the bend line, and said applying the bending force comprises moving a horizontal bending bar member upwardly or downwardly in a circular path along a pivoting axis parallel to the bend line to urge the bending bar member against one of the second patch section and the second sheet section, thereby urging other one of the second patch section and the second sheet section against the bend forming lip, and wherein the upper clamping die comprises the bend forming lip, the bending bar member comprises an oblong cross section having a cross-sectional length, and in the clamping arrangement, the first sheet section is adjacent to the lower clamping die, and the first patch section is adjacent to the upper clamping die, and wherein said moving the bending bar member comprises moving the bending bar member upwardly in the circular path to urge the bending bar member against the second sheet section with the cross-sectional length oriented normal to a plane of the section sheet section, thereby urging the second patch section against the bend forming lip, wherein the circular path has a radius greater than or equal to a thickness of the bend forming lip adjacent to the bend line.

2. The process of claim 1, wherein the first and second patch sections respectively comprise opposed first and second edge portions, each said edge portions being parallel to the bend line, and wherein said welding the first patch section comprises laser lap, edge or lap stitch welding the first edge portion to the blank panel sheet, and said welding the second patch section comprises laser lap, edge or lap stitch welding the second edge portion to the flange, and wherein prior to said bending, the process optionally further comprises further securing the first patch section to the blank panel sheet using one or more of crimping, clinching and bonding with an adhesive.

3. The process of claim 1, wherein the reinforcement patch and the rocker panel portion are independently obtained from one or more materials selected from the group consisting of steel, aluminum, iron and magnesium, and the reinforcement patch and the rocker panel portion independently have a tensile strength between about 780 MPa and about 2200 MPa, and a thickness between about 0.5 mm and about 3.0 mm.

4. A process for forming a reinforced rocker panel assembly comprising a rocker panel portion and at least one reinforcement patch welded to the rocker panel portion, the rocker panel portion comprising an elongated base section and a longitudinal flange integrally coupled to the base section, and the reinforcement patch comprising a first patch section and a second patch section coupled to the first patch section, wherein the process comprises: i) positioning the reinforcement patch in at least partial surface-to-surface contact with a blank panel sheet with the second patch section disposed proximal to a lateral edge of the blank panel sheet, and the first patch section disposed distal to the lateral edge, and welding the first patch section to the blank panel sheet; ii) clamping the first patch section and a first sheet section of the blank panel sheet positioned adjacent to the first patch section, the first patch section being welded to the first sheet section, and applying a bending force to the second patch section and a second sheet section of the blank panel sheet positioned adjacent to the second patch section, thereby forming the first and second sheet sections respectively into the base section and the flange along a bend line interposed between the first and second patch sections along a plane of the reinforcement patch, whereby the first and second patch sections respectively are in at least partial abutting contact with the base section and the flange; and iii) welding the second patch section to the flange to thereby form the reinforced rocker panel assembly, wherein said clamping comprises holding down the first patch section and the first sheet section on a stationary lower clamping die with a movable upper clamping die in a clamping arrangement, one or both said upper and lower clamping dies comprising a laterally disposed bend forming lip, wherein in the clamping arrangement, the bend forming lip is aligned with the bend line, and said applying the bending force comprises moving a horizontal bending bar member upwardly or downwardly in a circular path along a pivoting axis parallel to the bend line to urge the bending bar member against one of the second patch section and the second sheet section, thereby urging other one of the second patch section and the second sheet section against the bend forming lip, and wherein the upper clamping die comprises the bend forming lip, the bending bar member comprises an oblong cross section having a cross-sectional length, and in the clamping arrangement, the first sheet section is adjacent to the lower clamping die, and the first patch section is adjacent to the upper clamping die, and wherein said moving the bending bar member comprises moving the bending bar member upwardly in the circular path to urge the bending bar member against the second sheet section with the cross-sectional length oriented normal to a plane of the section sheet section, thereby urging the second patch section against the bend forming lip, wherein the circular path has a radius greater than or equal to a thickness of the bend forming lip adjacent to the bend line.

5. The process of claim 4, wherein the first and second patch sections respectively comprise opposed first and second edge portions, each said edge portions being parallel to the bend line, and wherein said welding the first patch section comprises laser lap, edge or lap stitch welding the first edge portion to the blank panel sheet, and said welding the second patch section comprises laser lap, edge or lap stitch welding the second edge portion to the flange, and wherein prior to said bending, the process optionally further comprises further securing the first patch section to the blank panel sheet using one or more of crimping, clinching and bonding with an adhesive.

6. The process of claim 4, wherein the reinforcement patch and the rocker panel portion are independently obtained from one or more materials selected from the group consisting of steel, aluminum, iron and magnesium, and the reinforcement patch and the rocker panel portion independently have a tensile strength between about 780 MPa and about 2200 MPa, and a thickness between about 0.5 mm and about 3.0 mm.

7. A process for forming a reinforced metal device, the process comprising: i) positioning a generally planar metal reinforcement patch having first and second patch sections in at least partial surface-to-surface contact with a base metal sheet, and welding the first patch section to the base metal sheet; ii) clamping the first patch section and a first sheet section of the base metal sheet positioned adjacent to the first patch section, the first patch section being welded to the first sheet section, and applying a bending force to the second patch section and a second sheet section of the base metal sheet positioned adjacent to the second patch section, thereby bending the second patch section and the second sheet section at a bending angle between about 20° and about 160° relative to the first patch section and the first sheet section along a bend line interposed between the first and second patch sections along a plane of the reinforcement patch, whereby the first and second patch sections respectively are in at least partial abutting contact with the first and second sheet sections; and iii) welding the second patch section to the second sheet section to thereby form the reinforced metal device, wherein said clamping comprises clamping the first patch section and the first sheet section between opposed first and second clamping dies in a clamping arrangement, each said clamping dies comprising respective clamping contact surfaces, and one or both said clamping dies comprising a bend forming lip extending normal to the clamping contact surface, wherein in the clamping arrangement, the bend forming lip is aligned with the bend line, and said applying the bending force comprises moving a bending bar member in a circular path along a pivoting axis parallel to the bend line and a longitudinal axis of the bending bar member to urge the bending bar member against one of the second patch section and the second sheet section, thereby urging other one of the second patch section and the second sheet section against the bend forming lip, and wherein the first clamping die comprises the bend forming lip, the bending bar member comprises an oblong cross section having a cross-sectional length, and in the clamping arrangement, the first sheet section is adjacent to the second clamping die, and the first patch section is adjacent to the first clamping die, and wherein said moving the bending bar member comprises moving the bending bar member in the generally circular path towards the first clamping die to urge the bending bar member against the second sheet section with the cross-sectional length oriented substantially normal to a plane of the second sheet section, thereby urging the second patch section against the bend forming lip, wherein the circular path has a radius greater than or equal to a thickness of the bend forming lip adjacent to the bend line.

8. The process of claim 7, wherein the first and second patch sections respectively comprise opposed first and second edge portions, each said edge portions being parallel to the bend line, and wherein said welding the first patch section comprises laser lap, edge or lap stitch welding the first edge portion to the base metal sheet, and said welding the second patch section comprises laser lap, edge or lap stitch welding the second edge portion to the second sheet section, and wherein prior to said bending, the process optionally further comprises further securing the first patch section to the base metal sheet using one or more of crimping, clinching and bonding with an adhesive.

9. The process of claim 7, wherein the metal reinforcement patch and the base metal sheet are independently obtained from one or more materials selected from the group consisting of steel, aluminum, iron and magnesium, and the metal reinforcement patch and the base metal sheet independently have a tensile strength between about 780 MPa and about 2200 MPa, and a thickness between about 0.5 mm and about 3.0 mm.

* * * * *